United States Patent [19]

Ostermann et al.

[11] Patent Number: 5,065,510
[45] Date of Patent: Nov. 19, 1991

[54] METHOD FOR THE MANUFACTURE OF A LIGHT METAL VEHICLE WHEEL

[75] Inventors: Friedrich Ostermann, Meckenheim-merl; Hans-Heinrich Plath, Niederk-Mondorf; Winfried Griep, Bonn, all of Fed. Rep. of Germany

[73] Assignee: Vereinigte Aluminium-Werke Aktiengesellschaft, Bonn, Fed. Rep. of Germany

[21] Appl. No.: 252,434

[22] Filed: Sep. 30, 1988

[30] Foreign Application Priority Data

Oct. 2, 1987 [DE] Fed. Rep. of Germany ....... 3733348

[51] Int. Cl.[5] ............................ B21B 1/02; B21K 1/32
[52] U.S. Cl. .............................. 29/894.324; 29/894.35; 29/894.36; 301/95
[58] Field of Search ............... 29/159.01, 159.1, 527.6, 29/527.7, 557; 72/352, 353, 354; 301/65, 95, 96, 97, 98

[56] References Cited

U.S. PATENT DOCUMENTS

| | | | |
|---|---|---|---|
| 3,750,450 | 8/1973 | Sharp et al. | 72/353 |
| 3,822,458 | 7/1974 | Schulte et al. | 29/159.01 |
| 3,964,144 | 6/1976 | Kopp | 29/159.01 |
| 4,048,828 | 9/1977 | Lucas et al. | 29/159.01 X |
| 4,275,932 | 6/1981 | Baird et al. | 301/97 X |
| 4,436,133 | 3/1984 | Rohr | 301/97 X |
| 4,561,275 | 12/1985 | Itou et al. | 72/70 |
| 4,597,426 | 7/1986 | Mauk et al. | |
| 4,624,038 | 11/1986 | Walther | 301/65 X |
| 4,708,749 | 11/1987 | Berg | 148/11.5 A |

FOREIGN PATENT DOCUMENTS

| | | |
|---|---|---|
| 0183243 | 6/1986 | European Pat. Off. . |
| 0205867 | 12/1986 | European Pat. Off. . |
| 690890 | 5/1940 | Fed. Rep. of Germany . |
| 1452614 | 3/1969 | Fed. Rep. of Germany . |
| 3244046 | 5/1984 | Fed. Rep. of Germany . |
| 3336239 | 4/1985 | Fed. Rep. of Germany . |
| 348137 | 9/1960 | Switzerland . |
| 390850 | 8/1965 | Switzerland . |
| 1388572 | 3/1975 | United Kingdom ................ 301/97 |

OTHER PUBLICATIONS

Patent Abstracts of Japan, Band 9, No. 176 (M-398) [1899], Jul. 20, 1985; JP-A-60 46 823 (Kobe Seikosho K.K.) 13-03-1985.

Primary Examiner—Timothy V. Eley
Assistant Examiner—Peter Dungba Vo
Attorney, Agent, or Firm—Darby & Darby

[57] ABSTRACT

A method and equipment for manufacturing a light metal vehicle wheel that has a rim drop base and a club-shaped thickened portion extending axially outward. The club-shaped portion has a tread on its outside surface for use in case of flat tire and has rim horns at its outer end. The method and equipment include pressing the rim horns radially inward by compression rings of a mold die. A radial inner surface of the club-shaped thickened portion is machined by chip removal so as to form an undercut next to the rim horn.

12 Claims, 3 Drawing Sheets

METHOD FOR THE MANUFACTURE OF A LIGHT METAL VEHICLE WHEEL

BACKGROUND OF THE INVENTIQN

The present invention relates to a method and to equipment for the manufacture of a light metal vehicle wheel.

It is known to provide vehicle wheels with very good emergency running properties in the case of a flat tire, as is known from the German disclosure 32 44 046. Such vehicle wheels have rim horns directed radially inward, which enable the rim to support itself areally on the inside of the tire which is in a depressurized state. The rim has a surface formed with a tread for use in the case of a flat tire.

It is known to produce the rim for such light metal wheels by casting or forging. In both cases, the rim horns, which are undercut, must be formed during an additional step of manufacture. This extra step creates problems, especially when a free space between the rim horn and the wheel disc is very small. Even foldable supporting tools acting in this free space to support the rim horn cannot be used. If the premolded rim has the finished contour of a tread on its outside for use in case of a flat tire and also has its radially inner surfaces parallel to the axis of rotating the rim at the same time, i.e. without undercuts, then a considerable amount of material will be wasted in the form of chips when the tire seating surfaces are machined to form the undercuts and to direct the rim horns radially inward.

SUMMARY OF THE INVENTION

It is an object of the present invention to simplify the manufacture of a light metal vehicle wheel as much as possible, with the end products being shaped with great accuracy while wasting very little material during the machining process by chip removal. It is a further object to provide equipment for use in such manufacturing.

In keeping with these objects, and others which will become apparent later, one aspect of the present invention resides in a method for manufacturing a light metal vehicle wheel which comprises premolding a rim with a club-shaped thickened portion which is directed axially outward and has an inside surface that is parallel to an axis of rotation of the rim, pushing radially inward the club-shaped thickening, and undercutting the inside surface of the club-shaped thickened portion next to rim horns. The club-shaped thickened portion also has an outside surface having a tread for use in case of a flat tire.

It is another aspect of the present invention to provide equipment for manufacturing the wheel, the equipment comprising an upper and lower compression ring of a die. The rim (workpiece) is inserted into the die and then the compression rings are moved toward each other, which presses the club-shaped portions of the rim radially inward. The equipment also includes a supporting and centering ring which engages a drop base of the rim form-fittingly and supports drop base flanks of the rim and centers the rim in the die. Further, a bolt can be used to center the rim in the hub area at the same time.

Therefore, an advantage of the present method is that merely a simple molding operation is added to the usual sequence of operations to form the wheel. Also, there is very little material scrap after machining by chip removal. Great accuracy of the rim's shape can be achieved through calibrated guidance of the compression rings and centering of the rim.

For a better understanding of the present invention, reference is made to the following description and accompanying drawings, while the scope of the invention is set forth in the appended claims.

DESCRIPTION OF THE PREFERRED EMBODIMENTS

Figure 1A:
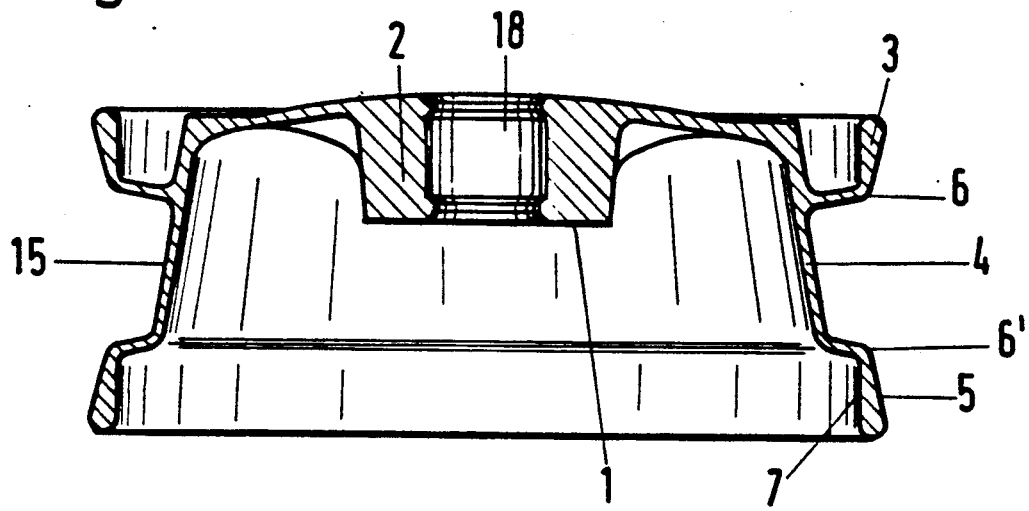
FIG. 1a a cross-sectional view of a rim premold in accordance the present invention.

Turning now to the drawings, FIG. 1a shows a rim 2 in a form prior to cold and/or hot molding and subsequent machining by chip removal. The rim 2 has a drop base 4. Extending from each axial end of the drop base 4 is a respective transition area 6, 6'. Extending axially outward from radial ends of the transition areas 6, 6, are club-shaped thickened portions 3. Each club-shaped thickened portion 3 has an outside surface with a tread 5 for use in case of a flat tire and has an inside surface 7 that is parallel to the axis of rotation of the rim 2. The club-shaped thickened portions 3 are dimensioned such that only the minimum material required to form the respective rim horns 9 is present.

Figure 1B:
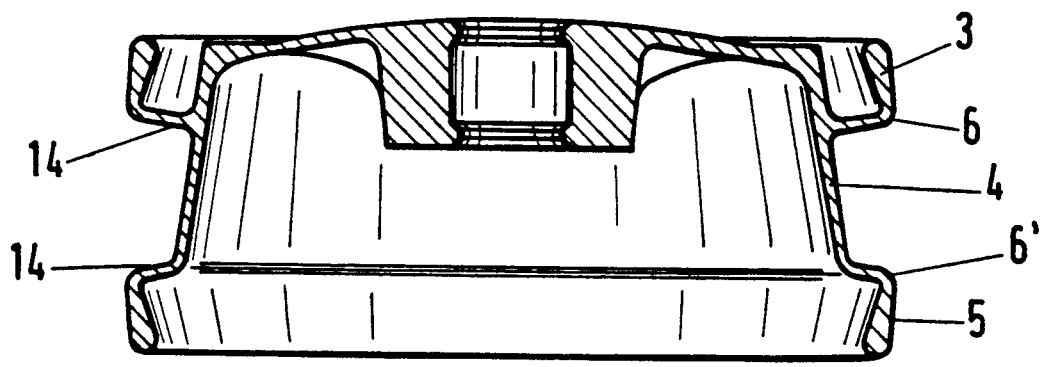
FIG. 1b shnows the rim of FIG. 1a after mold compression.

FIG. 1b shows the rim after mold compression has taken place. During mold compression, the club-shaped thickened portions 3 are pushed so far radially inward that the tread 5 declines from the drop base 4 to the outer edge of the rim horns 9 at an angle of 1 to 10 degrees, preferably at about 5 degrees, relative to the axis of rotation of the rim 2.

Figure 1C:
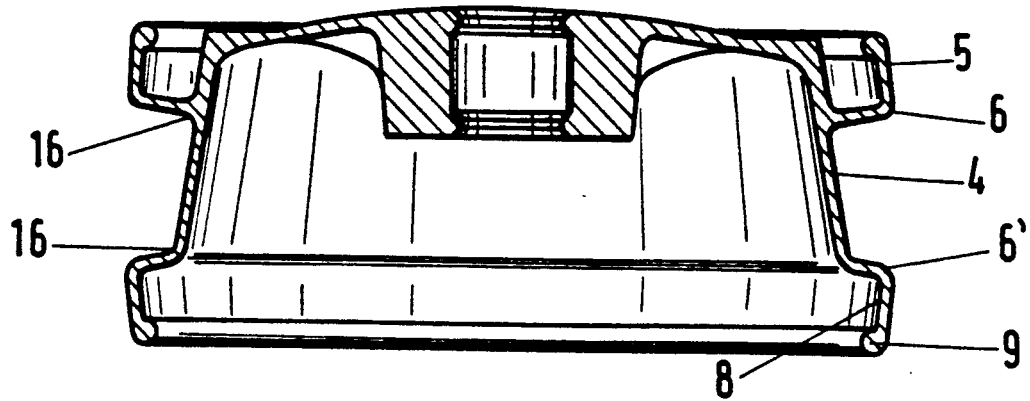
FIG. 1c shows a cross-sectional view of the finished rim after machining by chip removal.

FIG. 1c shows the final shape of the rim after machining by chip removal has taken place. After mold compression is completed, the tire seating surface 8 is machined in such a manner that the tread 5 and the tire seating surface 8 are parallel or nearly parallel to each other and the rim horns 9, which point inwardly, originate.

Figure 2:
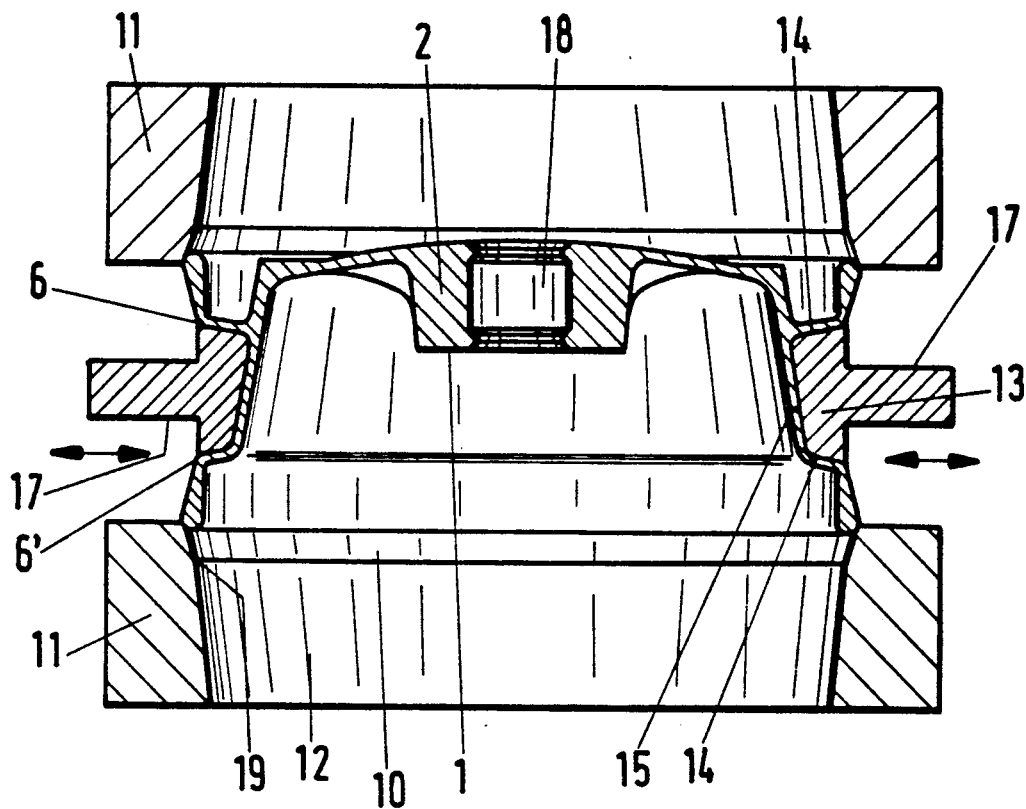
FIG. 2 shows a cross-sectional view of the rim premold inserted in the die at the beginning of the mold oompression operation.
Figure 3:
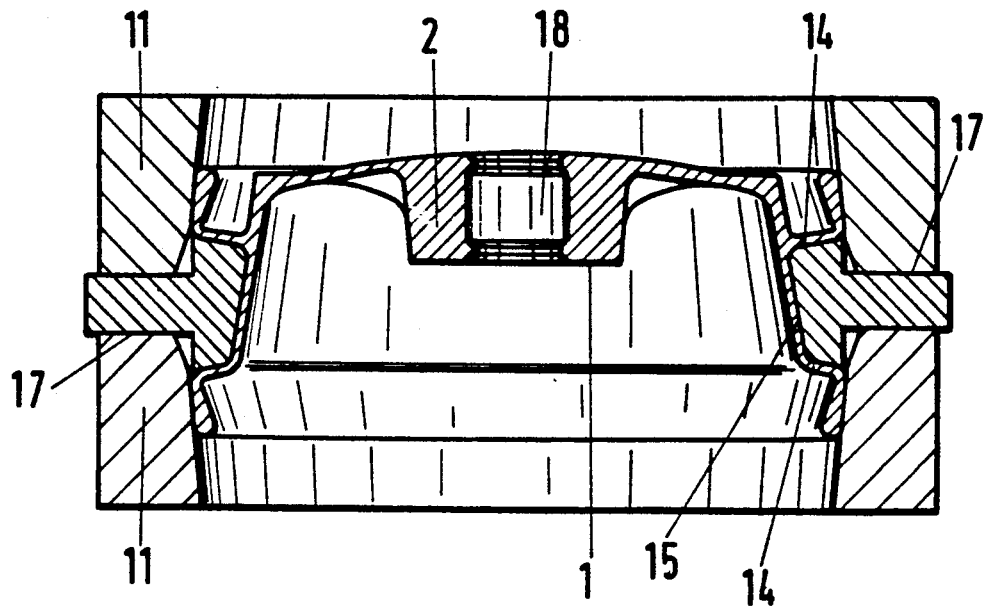
FIG. 3 shows a cross-sectional view of the rim in the completely closed die.

FIGS. 2 and 3 show progressive views of the mold compression operation, in which the die, with the rim 2 inserted, is in its initial position (open) per FIG. 2, and in its end position (completely closed) per FIG. 3. The die used for the mold compression operation has upper and lower compression rings 11, which are shown in cross-section in FIG. 4. Each compression ring 11 has a hole in its center having a funnel-shape formed by two concentric, truncated cone-shaped holes 10, 12 of different flare angles transiting into each other.

Figure 4:
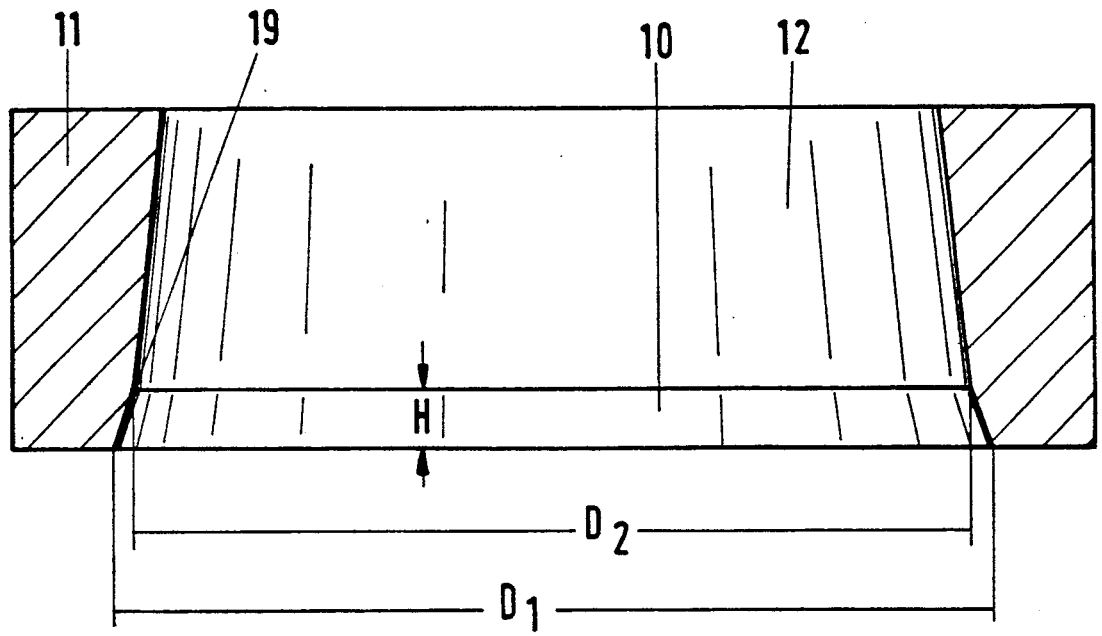
FIG. 4 shows a cross-sectional view of a compression ring.

Referring to FIG. 4, the diameter $D_1$ of hole 10 at the entry side of the compression ring 11 for rim 2 in premold form is slightly greater than or equal to the maximum outside diameter of the rim 2. At the transition area 19 of the hole to hole 12, the inside diameter $D_2$ of the compression ring 11 is slightly greater than or equal to the rim diameter at the transition area 6 of the drop base 4 to the tread 5. The flare angle of the hole 12 is between 2 and 24 degrees, preferably about 12 degrees. The flare angle should be selected 2 to 4 degrees greater than twice the amount of the desired angle between the tread 5 and the axis of the rim rotation, because the rim 2 in premold form (workpiece) will spring back by this amount when released.

Figure 5:
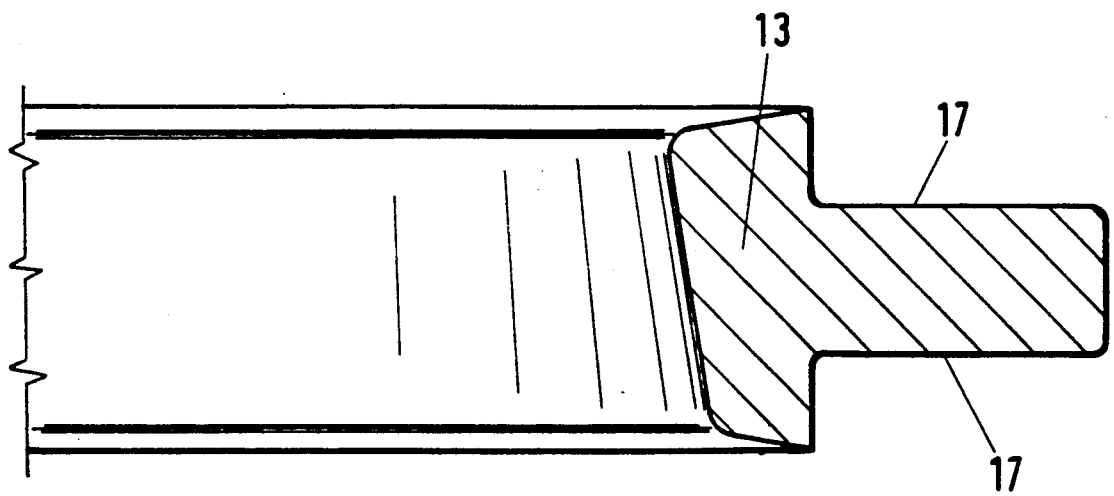
FIG. 5 shows a partial cross-sectional view of a support and centering ring for the rim premold.

FIGS. 2, 3 and 5 show a supporting and centering ring 13, which is required to support and center the rim 2 in the die. This supporting and centering ring 13 has several, preferably three, segments that are cut axis-parallel. In the operative position of the supporting and centering ring 13, these segments engage form-fittingly the drop base 4 of the rim 2. These segments then contact the drop base bottom 15 and the drop base flanks 14, which adjoin the drop base bottom 15 via radii portions 16. The segments form a largely closed ring around the rim drop base 4.

In the preferred embodiment, the segments of the supporting and centering ring 13 have stop surfaces 17, which become contacted by the compression rings 11 of the die in the closed state. The height H of the shallower hole 10 at the entry side of the compression rings 11 must be less than or equal to the vertical distance between stop surface 17 of the supporting and centering ring 13 and the transition area 6 between the drop base 4 and the tread 5 so that the die can be closed completely. The stop surfaces 17 prevent the compression rings 11 from travelling closer toward each other than is required for closing the die completely.

At the same time, a centering bolt may be used to center the rim 2 (workpiece) by contacting the bearing surface 1 of the fastening flange and the inside diametrical surface of the hole 18 of the rim 2 so as to fix these two surfaces into position.

The preferred light metal for use in the present invention comprises aluminum alloys. Wrought aluminum alloys are suitable as starting material for the manufacture of the vehicle wheels, which may be either forged or flow-turned. Preferably, alloys of the type aluminum magnesium silicon (AlMgSi), e.g. AlMgSiCu (6061), or alloys of the type aluminum magnesium manganese (AlMgMn) are used. To produce wheels by o casting, aluminum casting alloys of the type aluminum silicon magnesium (AlSiMg), e.g. AlSi7Mg (AA 356.0) may be used.

It should be understood that the cross-sectional views of FIGS. 1-4 are all symmetric relative to their respective centerlines. While the foregoing description and drawings represent the preferred embodiments of the present invention, it will be understood that various changes and modifications may be made without departing from the spirit and scope of the present invention.

What is claimed is:

1. A method for manufacturing a wheel comprising the steps of:
    pushing radially inward a club-shaped thickened portion of a rim so that as the club-shaped thickened portion extends axially outward to terminate at an outer end, the club-shaped thickened portion inclines radially inward, the club-shaped thickened portion having an outer surface formed as a tread for use during a flat; and
    undercutting a portion of the radially inner surface of the club-shaped thickened portion next to the outer end of the rim so as to form the outer end into a rim horn that is thicker than said portion that is undercut and extends further inward radially than does said portion that is undercut.

2. The method as defined in claim 1, wherein said undercutting includes machining by chip removal.

3. The method as defined in claim 1, wherein pushing radially inward includes mold compressing.

4. The method as defined in claim 1; and further comprising:
    the rim.

5. The method as defined in claim 4, wherein the forming includes forging wrought aluminum alloys selected from the group consisting of AlMgSi and AlMgMn.

6. The method as defined in claim 4, wherein the forming includes fow-turning wrought aluminum alloys selected from the group consisting of AlMgSi and AlMgMn.

7. The method as defined in claim 4, wherein the forming includes casting an aluminum alloy of Al Si Mg.

8. The method as defined in claim 1, wherein the pushing radially inward includes compressing the club-shaped thickened portion to decline at an angle between 1 and 10 degrees as measured between the tread and the axis of rotation of the rim.

9. The method as defined in claim 8, wherein the step of compressing includes declining the angle at about 5 degrees as measured between the tread and the axis of rotation of the rim.

10. The method as defined in claim 1; and further comprising:
    centering the rim during the radially inward pushing by centering in a hub area of the rim.

11. The method as defined in claim 1, wherein the step of pushing radially inward includes pushing the club-shaped thickened portion from a first position, in which a radial inner surface of the club-shaped thickened portion is parallel to an axis of rotation of the rim, to a second position, in which the radial inner surface inclines radially inward as the radial inner surface extends axially outward.

12. A method for manufacturing a wheel, comprising the steps of:
    forming a rim to have a club-shaped thickened portion which extends axially outward to terminate at an outer end, the club-shaped thickened portion having an outer surface formed as a tread for use during a flat, the club-shaped thickened portion having a radial inner surface which is parallel to an axis of rotation of the rim; and
    pushing radially inward the club-shaped thickened portion so that as the club-shaped thickened portion extends axially outward, the club-shaped thickened portion inclines radially inward such that the outer end extends further inward radially than a remainder of said club-shaped thickened portion.

* * * * *